United States Patent [19]
Orain

[11] Patent Number: 4,915,513
[45] Date of Patent: Apr. 10, 1990

[54] CROSSED TAPERED ROLLER BEARING AND APPLICATION THEREOF IN A HUB FOR AN AUTOMOBILE

[75] Inventor: Michel A. Orain, Conflans Ste Honorine, France

[73] Assignee: Glaenzer Spicer, Poissy, France

[21] Appl. No.: 196,256

[22] Filed: May 20, 1988

[30] Foreign Application Priority Data

May 22, 1987 [FR] France ................................ 87 07213

[51] Int. Cl.$^4$ ........................ F16C 19/50; F16C 19/40
[52] U.S. Cl. ..................................... 384/447; 384/551; 384/571; 384/589
[58] Field of Search ............... 384/447, 449, 450, 548, 384/551, 571, 586, 589, 618–622

[56] References Cited

U.S. PATENT DOCUMENTS

| | | | |
|---|---|---|---|
| 1,736,037 | 11/1929 | Else | 384/571 X |
| 2,040,741 | 5/1936 | Hoke | 384/571 |
| 2,734,786 | 2/1956 | McNicoll | 384/447 |
| 3,361,501 | 1/1968 | Messinger et al. | 384/620 |
| 4,023,869 | 5/1977 | Caldwell | 308/214 |
| 4,479,683 | 10/1984 | Kanamaru | 384/619 |
| 4,795,277 | 1/1989 | Colanzi | 384/447 |

FOREIGN PATENT DOCUMENTS

| | | | |
|---|---|---|---|
| 0046646 | 3/1982 | European Pat. Off. | |
| 1229564 | 9/1960 | France | 384/447 |
| 2032171 | 11/1970 | France | |

Primary Examiner—Thomas R. Hannon
Attorney, Agent, or Firm—Wenderoth, Lind & Ponack

[57] ABSTRACT

Rollers (9a) having a frustoconical lateral wall interposed between two raceways (4, 6) of two rings (1, 2) alternate with rollers (9b) interposed between two other raceways (3, 7) of the rings (1, 2). A crown region (11) of the large base of each roller slides against the confronting raceway (7) or (6) on the outer ring (2). Crown regions (11) of the rollers (9a, 9b) of each series of rollers substantially pertain to a common ideal sphere (Sx,Sy) centered on a common apex (X, Y) toward which converges the lateral walls of the rollers of the same series and the associated raceways. The angle made between the two raceways of the outer ring is less than 90°. By this arrangement is achieved, between the crown region of each roller and the raceway against which the crown region bears, a contact (T) distributed along a segment of a circle centered on the axis of the bearing.

17 Claims, 5 Drawing Sheets

CROSSED TAPERED ROLLER BEARING AND APPLICATION THEREOF IN A HUB FOR AN AUTOMOBILE

BACKGROUND OF THE INVENTION

1. Field of the Invention

The present invention relates to a crossed tapered roller bearing.

2. State of the Prior Art

Such a bearing is known from FR-A-2,032,171. It comprises two coaxial rings disposed one around the other and each defining, in confronting relation, a concave annular surface having a V-shaped section defining two tapered raceways. An even number of tapered rollers is disposed between these two rings. Every other tapered roller is interposed by its lateral wall between one of the raceways of one of the rings and the raceway located in an axially opposed position on the other ring. The other tapered rollers, alternating with the first mentioned rollers, are interposed by their lateral wall between the other two raceways. To permit the assembly, one of the rings is in two parts, each of which defines one of the raceways. Further, for guiding the rollers, the angle of the V of the outer ring is in the neighbourhood of 90° and each tapered roller has a crowned large base whose peripheral edge bears against the raceway of the outer ring against which its lateral wall does not bear.

This type of rolling bearing has a number of advantages, in particular: compactness, ease of assembly, large resistance to tilting torques, i.e. torques which tend to cause one of the rings to pivot relative to the other about a diameter, large axial and radial load acceptance, ease of adjustment of the clearance by the surfacing of one or of both of the confronting surfaces of the two semi-rings constituting the ring made in two parts, no roller cage required, etc.

However, notwithstanding these advantages, the crossed roller bearing has not been the subject of practical applications up to the present time due to problems of the guiding of the rollers. It has been found in certain applications that an exaggerated wear occurs on the edge of the large base of the rollers which is in sliding contact with one of the raceways of the outer ring for guiding the roller. It has also been found that, in some cases, notwithstanding the guiding by the crown surface, the rollers assume a skewed position and jam the bearing.

SUMMARY OF THE INVENTION

An object of the invention is to overcome the above drawbacks and in particular to provide a crossed tapered roller bearing whose rollers are guided without wear or risk of jamming.

The invention therefore provides a crossed tapered roller bearing comprising an inner ring, an outer ring disposed coaxially around the inner ring, the rings having, in confronting relation, two tapered raceways together defining a concave profile, and two series of rollers having a generally frustoconical shape. The rollers of a first series have a frustoconical lateral wall interposed between one of the raceways of the outer ring and an axially opposed raceway of the inner ring, while the rollers of the second series, which alternate with the rollers of the first series, have their lateral wall interposed between the other two raceways. A crown region of the large base of each roller bears in a sliding manner, against the confronting raceway on the outer ring, while the frustoconical lateral walls of the rollers of the same series and the two frustoconical raceways between which they are interposed converge toward a common apex located on the axis of the bearing.

According to the invention, a feature of the bearing is that the crown regions of the rollers of each series of rollers substantially pertain to a common ideal sphere centered on the common apex to which the lateral walls of the rollers of the same series converge. The angle made between the two raceways of the outer ring is less than 90°, so as to realize between the crown region of each roller and the raceway against which it bears a contact which is substantially along a segment of a circle centered on the axis of the bearing.

The crown region is a spherical surface centered on the virtual apex of the frustum of a cone of the lateral wall. In this way, the crown surface and the frustoconical lateral wall have a circular, possibly chamfered, common edge along which they make an angle of 90°. This edge cannot come in contact with the edge common to the two raceways of the outer ring since the angle therebetween is less than 90°. Thus, the aforementioned theoretical or real annular edge of each roller is tangent to the raceway of the outer ring against which the lateral wall of the roller bears, but this tangent point is spaced away from the other raceway.

All the crown surfaces of the rollers of the same series substantially pertain to the same sphere, coming to bear against the interior of the concave frustum of a cone formed by the other raceway of the outer ring. It is known that the tangent line between two such surfaces is a circumference. Therefore, the crown region of each roller bears, by a segment of a circumference, against the other raceway at a distance from the common edge between the two raceways of the outer ring.

Therefore, the contact between the crown region and the raceway occurs not at a point but along a line. Consequently, the pressure of contact, and thus the wear and mechanical losses by sliding, are distinctly reduced. Moreover, the segment of contact is oriented circumferentially relative to the axis of the bearing, i.e. along the desirable direction for stabilizing the roller as concerns its possible tendency to assume a skewed position between the two rings, whence increased precision and smoothness of operation combined with a capacity to operate without play during a prolonged and severe service.

According to a second aspect of the invention, in the application of the aforementioned bearing in an integral hub for an automobile wheel, the inner ring is formed by a driven element of the transmission joint and the outer ring is made in two semi-rings, one of which is an integral part of a hub-carrier, the other of which is an annular flange fixed against the hub-carrier around the driven element of the transmission joint.

The term "integral hub" is intended to designate a hub combining in a single piece the driven element of a transmission joint, the inner ring of the wheel rolling bearing and the fixing flange of the driving wheel.

When these integral hubs are combined with conventional rolling bearings, having two rows of balls or tapered rollers for example, the outer raceway must be made radially eccentric relative to the inner raceway when assembling, so as to introduce the balls. Now, at the moment of this operation, a sealing element is already in position between the wheel disc and the hub-carrier (it would not be possible to mount this sealing element later on). The sealing lips of the sealing element must therefore be subjected to this radial offset of several millimeters, and thereafter resume their correct position and their continuous contact with the bearing surface, without any possibility of checking the lips, since these lips are hidden. Bearing in mind the delicate nature of these types of sealing elements, this assembly requirement constitutes a serious drawback. In contrast, in the case of the application of the invention, the rotating sealing surfaces are slipped axially inside the sealing elements and there is therefore no abnormal stressing applied to the sealing lips upon assembly.

BRIEF DESCRIPTION OF THE DRAWINGS

Other features and advantages of the invention will be apparent from the following description.

Of a preferred embodiment of the invention, taken with the accompanying drawings, wherein.

DESCRIPTION OF THE PREFERRED EMBODIMENTS

Figure 1:
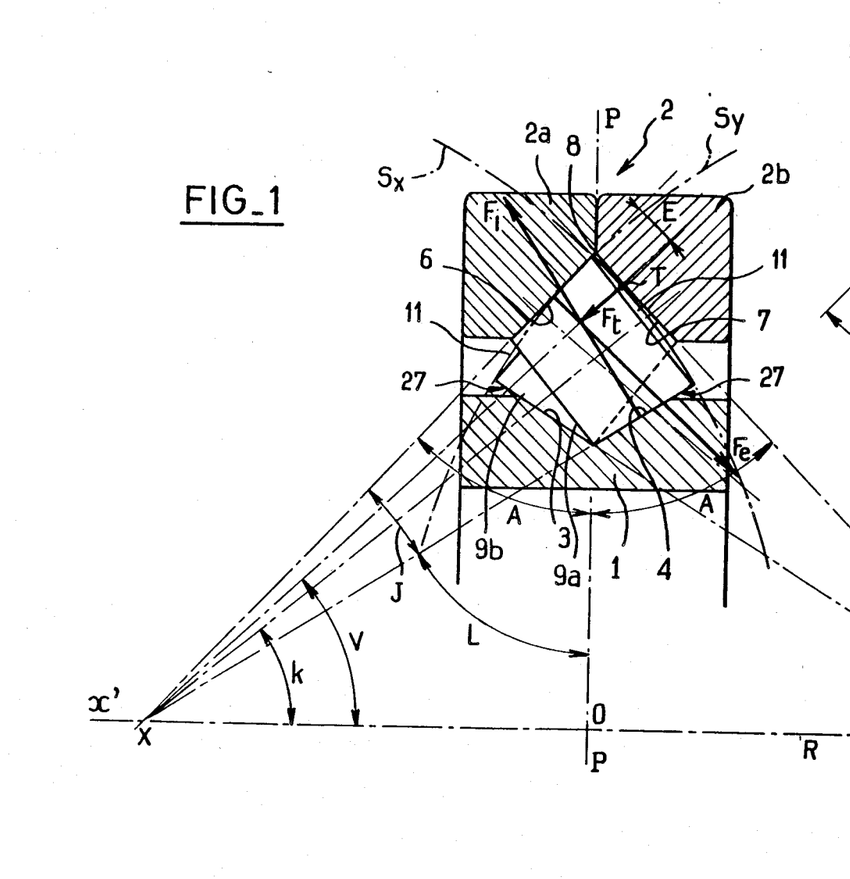
FIG. 1 is a diagrammatic and partly sectional view of a rolling bearing according to the invention.

As shown in FIG. 1, the rolling bearing having crossed tapered rollers comprises an inner ring 1 and an outer ring 2 disposed coaxially around the inner ring 1. These rings each present in confronting relation two tapered raceways 3, 4 and 6, 7, respectively, together defining on each ring a concave V-shaped section. The ring 2 is made in the form of two semi-rings 2a and 2b, one of which carries the raceway 6 and the other the raceway 7. They are fixed against each other in a bearing plane PP perpendicular to the axis x'x of the rolling bearing and passing through the common circular edge 8 of the raceways 6 and 7. The plane PP is a plane of symmetry for all the operational surfaces of the rings 1 and 2. It intersects the axis x'x at 0.

Two series of rollers 9a and 9b having a generally frustoconical shape and all identical are interposed between the rings. The rollers 9a of a first of said series have their frustoconical lateral wall interposed between the raceway 6 of the outer ring 2 and the axially opposed raceway 4 of the inner ring 1. The rollers 9b of the second series alternate with those 9a of the first series and have their lateral wall interposed between the other two raceways 3 and 7.

The frustoconical lateral walls of the rollers 9a and the two frustoconical raceways 4 and 6 between which they are interposed converge toward a common apex X located on the axis x'x of the bearing. In other words, X is the apex of all the frustums of a cone defining the raceways 4 and 6 and the lateral walls of the rollers 9a. Likewise, the frustoconical lateral walls of the rollers 9b and the two frustoconical raceways 3 and 7 between which they are interposed converge toward a common apex Y located on the axis x'x of the bearing. The apices X and Y are symmetrical to each other relative to the plane PP.

A crown region 11 of the large base of each roller 9a or 9b bears in a sliding manner against the confronting raceway 7 or 6 on the outer ring 2. In the example, the crown region 11 extends over the whole of the large base of each roller 9a or 9b. The geometric locus of the sliding contact, which will be described hereinafter, is designated by the reference T.

According to the invention, the crown regions 11 of the roller 9a pertain to a common ideal sphere Sx centered on the common apex X of the lateral walls of these rollers. Likewise, the crown regions 11 of the rollers 9b pertain to a common ideal sphere Sy centered on the common apex Y of the lateral walls of these rollers.

Figure 1A:
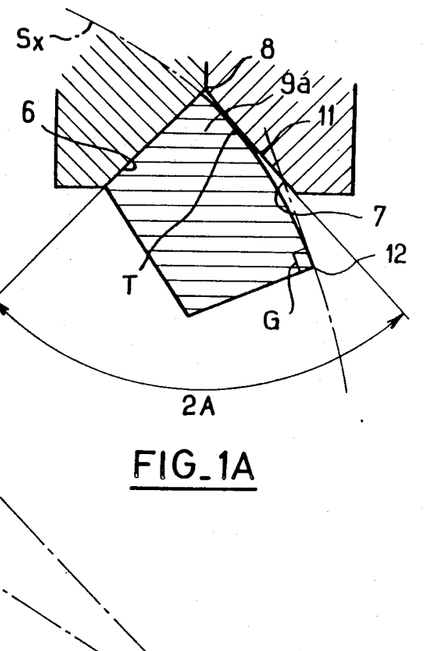
FIG. 1A is a partial sectional view through the axis of a roller at an enlarged scale.

Thus, as shown in FIG. 1A, the angle G made by each roller 9a or 9b, as seen in axial section, along its common annular edge 12 between the lateral wall and the crown region 11 is an angle of 90°.

Furthermore, the angle 2A made between the two raceways 6 and 7 of the outer ring 2 is less than 90°. Bearing in mind the symmetry relative to the plane PP, each raceway 6 or 7 therefore makes an angle of less than 45° with the plane PP.

Thus, when considering a roller 9a (FIG. 1A) whose lateral surface has, by construction, a generatrix bearing against the raceway 6, its edge 12 cannot come into contact with the edge 8 between the raceways 6 and 7 since the angle G, which is equal to 90°, is larger than the angle 2A. Consequently, the region of contact T is itself spaced from the annular edges 12 and 8.

Figure 4:
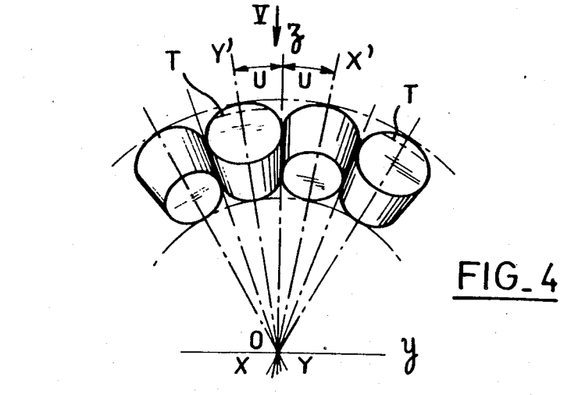
FIG. 4 is a diagrammatic view in a direction along the axis of the bearing showing the rolling relative arrangement of the rollers.

The contact T results from the fact that the sphere Sx is tangent to the concave frustum of a cone 7, or from the fact that the sphere Sy is tangent to the concave frustum of a cone 6. This tangency occurs along a circle centered on the axis x'x of the frustums of a cone. The regions T are therefore, geometrically, segments of these two circles. Some of these segments are shown in FIG. 4.

On the tangent line T, the radius of curvature of the tapered raceway 6 or 7 is equal to the radius of the spheres Sx and Sy and it is centered on the respective centre X or Y.

Some numerical features of the bearing will now be described.

The total number of rollers 9a and 9b is an even number since the number of rollers 9a is equal to the number of rollers 9b. The total number must preferably be between 14 and 28, with an optimum number of 20 or 22 rollers.

A larger number of rollers may result in their self-wedging and jamming of the bearing.

Indeed, as the rollers are assumed to be substantially in adjoining relation to one another in the circumferential direction, a large number of rollers results in a small taper of the rollers and consequently in a poor self-guiding of the latter between the rings.

The maximum limit number "n" depends on the effective coefficient of sliding f between the raceways 3, 4, 6, 7 and the tapered surface of the rollers 9a, 9b.

EXAMPLE $$f = 0.10 \quad n \leq 28$$
$$f = 0.08 \quad n \leq 34$$

As the coefficient of sliding f itself depends on the surface states and the lubrication, and consequently presents risks of substantial variations, it is preferred to provide a smaller number of rollers.

A number of rollers less than 14 has the drawback of considerably reducing the diameter of the inner shaft or, for a given diameter of the inner shaft, resulting in an unacceptable diametrical overall size. These considerations concern principally the application in a wheel hub for a front-wheel drive shown in FIG. 2. In this application, which will be described in detail hereinafter, the rollers 9a, 9b are disposed around the driven outer element 13 of a homokinetic joint.

Figure 6:
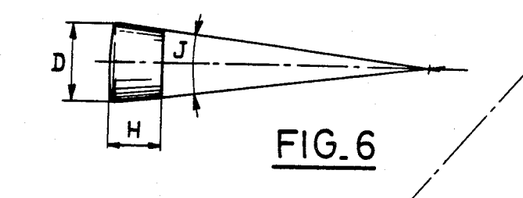
FIG. 6 is a view of a roller.

The ratio D/H of the maximum diameter D of a non-chamfered roller to its axial dimension H is greater than 1.1 (FIG. 6).

In the case of rollers whose annular edge 12 is chamfered, the diameter D is the diameter of the theoretical edge before chamfering.

The line of contact T of the spherical region 11 of each roller with the confronting tapered outer raceway is located at a distance preferably equal to 10 to 20% of the diameter of the large base of the roller, measured from the edge 8. This position is defined by the angle E (FIG. 1). In other words, the angle E must preferably be equal to 10 to 20% of the angle at the apex J of the roller.

Figure 8:
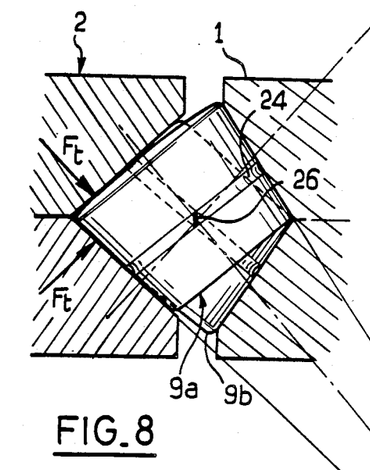
FIG. 8 is a view similar to FIG. 1 but concerning a practical configuration of the rollers.
Figure 9:
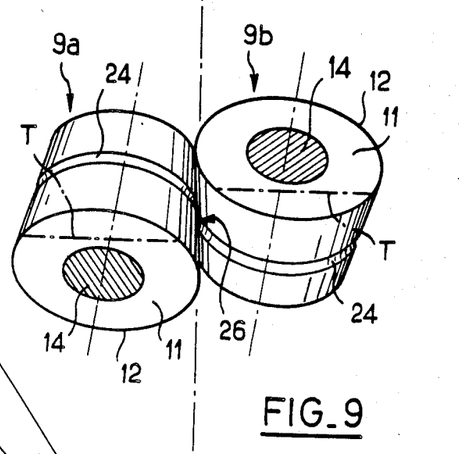
FIG. 9 is a perspective view of two rollers of FIG. 8 the chamfers of which are not shown.
Figure 13:
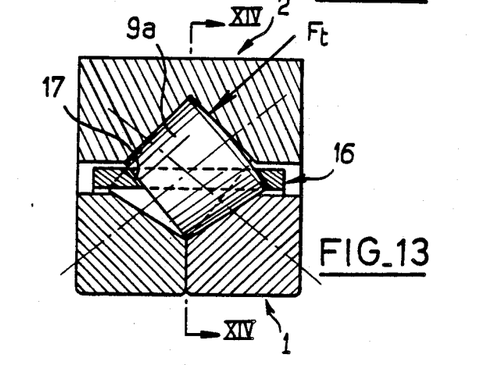
FIG. 13 is a view similar to FIG. 1 but concerning an embodiment with a cage and an inner ring in two parts.
Figure 14:
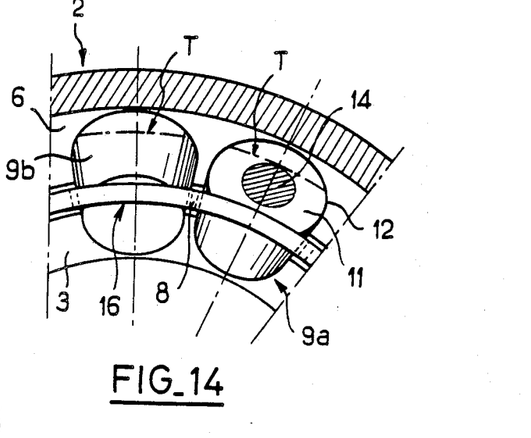
FIG. 14 is a partial sectional view taken on line XIV—XIV of FIG. 13.

The tangent line T of the spherical region 11 of each roller 9a or 9b with the tapered raceway 6 or 7 against which the roller is guided and bears thus has an effective length substantially between 50% and 75% of the large diameter of the roller, preferably, for the purpose of ensuring a positive directional guiding with a minimum of sliding (see FIGS. 9 and 14). The bearing and guiding forces are represented by the arrows $F_t$ in the sectional views of FIGS. 1, 8 and 13.

It is sufficient that the large base of the frustum of a cone be spherical, at least in the annular region in the vicinity of the lateral frustoconical wall.

The central region at the crest 14 of the large base, which is not operational, may be flat or hollow. It is represented by a cross-hatched region in FIGS. 9 and 14. The small base of the roller 9a or 9b has no operational function and its profile and dimensions need no precision.

Figure 5:
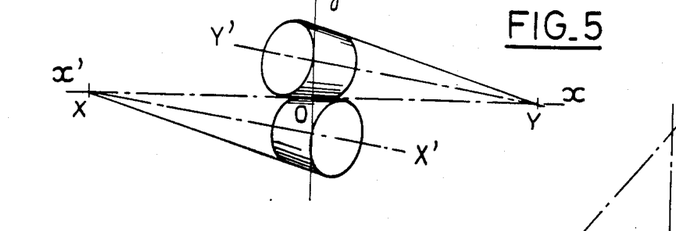
FIG. 5 is a view of two rollers in the direction of arrow V of FIG. 4.

The rollers may be in adjoining relation to one another (FIGS. 4 and 5) except for a sufficient circumferential clearance. This feature allows the elimination of the cage, which is absolutely essential for guiding the rollers of conventional tapered roller bearings.

A cage of plastics material or metal or of a composite material (FIGS. 13 to 15) may, however, be installed in the conventional manner and ensure a separation of the neighbouring rollers 9a and 9b. It may constitute an interesting variant of a basic rolling bearing calculated for adjoining rollers in respect of which two rollers have been removed. For example, a rolling bearing having 28 adjoining rollers may provide a variant with a cage comprising 26 rollers with the use of the same raceways and the same rollers. In any case, the cage here merely has a roller separating function, and not a precise direction guiding function, as is the case in conventional rolling bearings.

Figure 15:
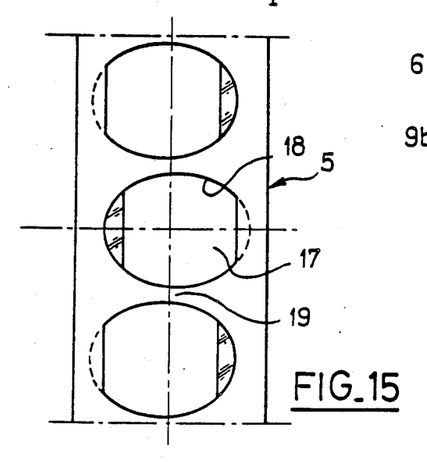
FIG. 15 is a developed partial view of a cage.

In FIGS. 13, 14 and 15, the cage 16 of metal or plastics material, interposed between the rings 1 and 2, defines openings 17 whose edges 18 may bear with a sliding contact on the tapered lateral wall and the spherical base of each of the rollers 9a and 9b. This cage is guided on the rollers and precludes contact between neighbouring rollers due to the bars 19 between the openings 17.

Figure 10:
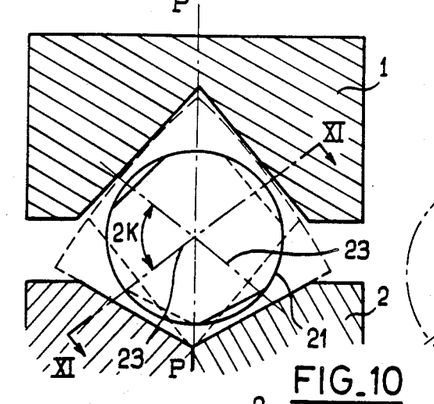
FIG. 10 is a simplified view similar to FIG. 1 of the positioning of an inserted pellet.
Figure 11:
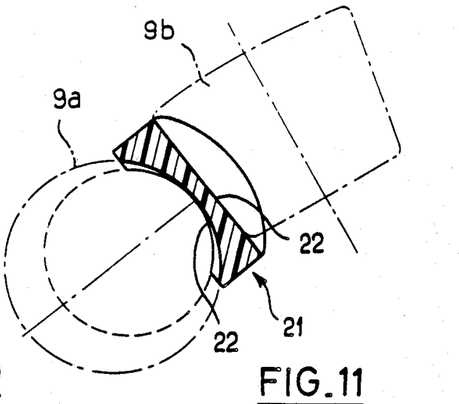
FIG. 11 is a sectional view taken on line XI—XI of FIG. 10.
Figure 12:
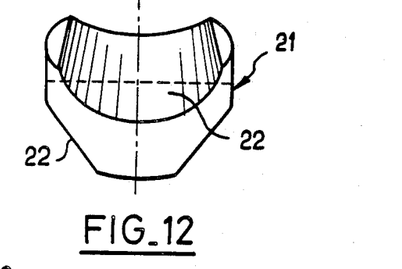
FIG. 12 is a perspective view of a pellet.

The separation between rollers may also be advantageously ensured by inserted pellets or separating members 21 of plastics material or metal, each of the sides of which conforms with the conical shape of each of the two contiguous rollers 9a and 9b against which it bears and is guided (FIGS. 10, 11, 12).

Figure 3:
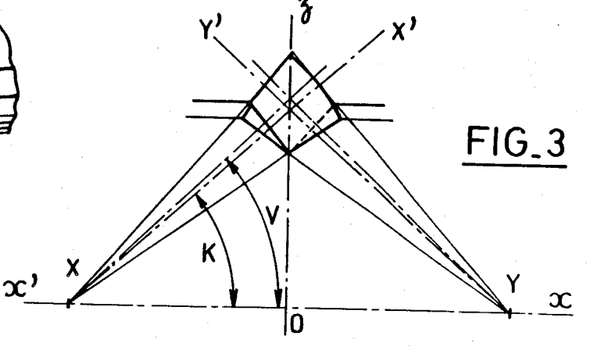
FIG. 3 is a diagrammatic view corresponding to FIG. 1.

Each pellet 21 has two opposed concave conical surfaces 22. The axes 23 of the cones make an angle equal to 2K, K being the angle made by the axis XX' or YY' of each roller with the axis xx' of the bearing (FIG. 3).

In the absence of a cage or pellets, the sliding between adjacent rollers may be facilitated by a slight circular recess 24 having a hollow hyperbolic profile centered on the circumference of contact between the rollers.

Therefore, the contact between the rollers occurs along a segment of a line 26 (FIGS. 8 and 9) and no longer at a point. The center of the line of contact 26 is at the projected intersection (FIG. 3) of the two axes XX' and YY', each of which makes an angle K with the axis xx'.

Figure 7:
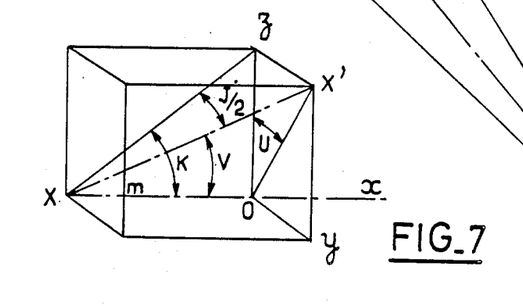
FIG. 7 is a geometric construction showing the interdependency of the characteristic angles of the rolling bearing permitting, a ready calculation of each angle thereof as a function of the other angles.

FIG. 7 represents a geometrical construction giving the geometrical relations between the characteristic angles of the bearing, in particular the aforementioned angle K, the angle V at which are seen, from the center X (rollers 9a) and relative to the axis x'x, the segments of contact T, the angle U equal to one half of the angle circumferentially occupied by each roller 9a and 9b (FIG. 4), and the angle J/2 equal to one half of the apex angle of each roller.

The characteristic angles of the bearing are only a function of the number of rollers assumed to be substantially in adjoining relation to one another and of the guiding angle E adopted, since the straight line XT is perpendicular at T to the outer raceway which forms with the plane PP an angle A. For example:

| Number of adjoining rollers n | 16 | 22 | 28 |
|---|---|---|---|
| Number of rollers with cage (n-2) | 14 | 20 | 26 |
| Angle of the guiding line: E | 2.115° | 1.590° | 1.273° |
| Angle of the outer raceways: A | 43.9420° | 44.2046° | 44.3631° |

| | | | |
|---|---|---|---|
| Angle at the center of the rollers: J | 14.1060° | 10.6049° | 8.4911° |

Consequently, the angle E is substantially between 1° and 2.5°, the angle A substantially between 43.5° and 44.5°, the angle 2A substantially between 87° and 89°, and the angle J substantially between 8° and 15°.

The angle of the inner raceways: L=A+J (relative to the plane PP).

FIG. 1 diagrammatically represents a rolling bearing having 16 rollers. The rollers have their edges, such as the edge 12, removed by radii solely shown in FIG. 8.

The raceways 3 and 4 may be advantageously truncated by reducing the outside diameter of the inner ring 1 so as to leave a part of the generatrix of the roller in overhanging relation as shown at 27 in FIG. 1. This arrangement results in equally distributing the pressure of contact of the lateral wall of each roller along the line of contact on the raceway of the inner ring 1 and on the raceway of the outer ring while ensuring the equilibrium of the roller under the effect of the three resultants of the pressures $F_e$ and $F_i$ on the outer and inner raceways and $F_t$ on the spherical guiding bearing surface. In this way, the capacity of the bearing is maximized.

Figure 2:
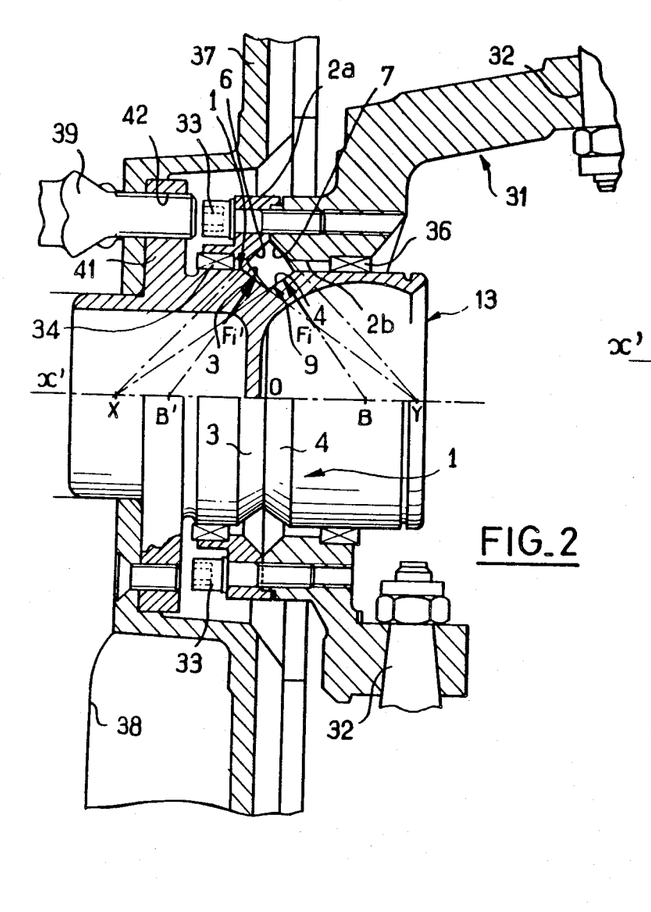
FIG. 2 is a partial axial sectional view of an integral hub of a front driving wheel of an automobile.

There will now be described, with reference to FIG. 2, the application of the bearing in an integral hub for a front wheel of a front-wheel drive automobile.

A hub-carrier 31 is mounted on steering pivots 32. The hub-carrier 31 has a central opening around which it defines a semi-ring 2b in one piece, and in particular a raceway 7 of a rolling bearing operationally similar to that described with reference to FIG. 1.

This bearing, the rollers 9 of which have only been shown in the upper part, supports a driven outer element 13 of a homokinetic joint, which is itself extended by a flange 41 receiving a driving wheel 38 and a brake disk 37. This outer element is in one piece with the inner ring 1 of the bearing and it defines, in particular in its peripheral outer wall, two raceways 3 and 4.

The other outer semi-ring 2a carrying a raceway 6 is formed by an annular flange screwed to the hub-carrier by bolts 33. An annular sealing element 34 is interposed between the flange 2a and the element 13. Another annular sealing element 36 is interposed between the ring 2b (defined by the hub-carrier 31) and the element 13.

The assembly is carried out in the following manner:

The sealing elements 34 and 36 are slipped into the rings 2a and 2b, respectively. The element 13, separated from any other element, in particular its brake disk 37, the wheel rim 38, and the wheel fixing bolts 39, is placed on a table so that its axis is vertical and the fixing flange 41 of the wheel 38 is under the raceways 3 and 4. The ring 2a is then fitted onto the element 13, the rollers 9 are placed in position, and the hub-carrier 31 with its sealing element 36 is fitted onto the element 13. The bolts 33, engaged through the as-yet unoccupied openings 42 in the flange 41 for the bolts 39, are placed in position for locking the assembly.

In this way, there is produced a sub-assembly comprising the hub-carrier/roller bearing/homokinetic joint element, which is ready for subsequent assembly steps.

This bearing combines a number of advantages over conventional bearings:

A great simplicity of design is realized, with the raceways 3, 4, 6, 7 being rectilinear and narrow.

Easy adjustment of the pre-stress of the rollers is accomplished by surfacing of the bearing surfaces of one or both of the outer semi-rings (FIG. 1) or of the inner semi-rings (FIG. 13). Indeed, this bearing must necessarily have its outer raceways in two parts or its inner raceways in two parts to permit assembly. By surfacing either one of the mutual bearing surfaces, or having the two bearing surfaces of the two semi-rings constituting the ring in two parts, the pre-stressing of the rollers between the rings is adjusted.

The roller bearing has great rigidity with regard to tilting moments. This bearing is perfectly adapted to the structure of particularly compact hubs for front-wheel drive automobiles (FIG. 2). The characteristic distance BB' of the resistance to tilting is particularly large. The points B and B' are located at the intersection of lines of action of the forces $F_i$ and $F_i'$ associated with the rollers 9a and 9b with the axis of rotation xx'.

The roller bearing further has great strength and resistance to eccentric lateral shocks (example: lateral abutment against a pavement). Indeed, in a ball bearing, the ellipse of contact between each ball and its raceways lengthens and moves toward the marginal angle of the raceway and tends to chip the raceway.

In conventional tapered roller bearings, it is the lips defined by the inner rings for axially retaining the rollers which are violently stressed.

On the other hand, in the proposed type of bearing, in the event of lateral shock, the directions and positions of the forces $F_e$, $F_i$, and $F_t$ are not modified. Thus, the surfaces of contact retain all of their capacity for overload absorption.

The roller bearing of the present invention is further characterized by practically a complete absence of sliding, and therefore very low heating in use.

Indeed, the sole sliding occurring in the region of the force $F_t$ (FIG. 1) occurs under low load, $F_t$ being small relative to $F_i$. Moreover, the speed of sliding is low since the ratio E/J is small.

Lastly, the pressure along the segments T is small by construction according to the invention, since:

(a) The radius of the sphere of the spherical regions 11 is equal to the inside radius of the tapered raceways 6 and 7 along the segments T, and (b) The radius of a sphere equal to XT is, relatively, very large. For the very low pressure at T, the sliding therefore occurs under ideal conditions of lubrication.

The roller bearing also has a small axial size, overall, due to the presence of a single row of rolling bodies (rollers 9a and 9b).

Furthermore, sealing elements of 9 conventional type (not shown), therefore reliable and cheap, are easily installed.

A cage is not essential. If a cage is provided, it merely has a roller-spacing function and not a guiding function. It can therefore be manufactured without precision and from cheap materials, such as plastics.

The roller bearing according to the present invention is cheap to manufacture, because the rollers may be manufactured by cold forming, and the assembly and adjustment of the bearing is thus very simple and rapid and requires no special precautions. The bolts employed for attaching the hub-carrier pivot are also used for the assembly of the bearing and its pre-stressing adjustment.

The fact that it is easy to produce the outer raceways and it is easy to adjust the pre-stressing permits machining of one of the outer raceways directly in the body of the hub-carrier pivot so that the number of main component parts is reduced to the strict minimum, with a resulting positive effect on the reduction in machining and assembling costs.

In some applications, for example in bearings for aircraft or helicopter propellers, spindle-carrying chucks and headstocks of machine tools, lathes, milling machines, drilling machines, etc., and crane turrets, drilling apparatus, etc., an axial capacity distinctly predominant in one direction is required of the bearings.

Figure 16:
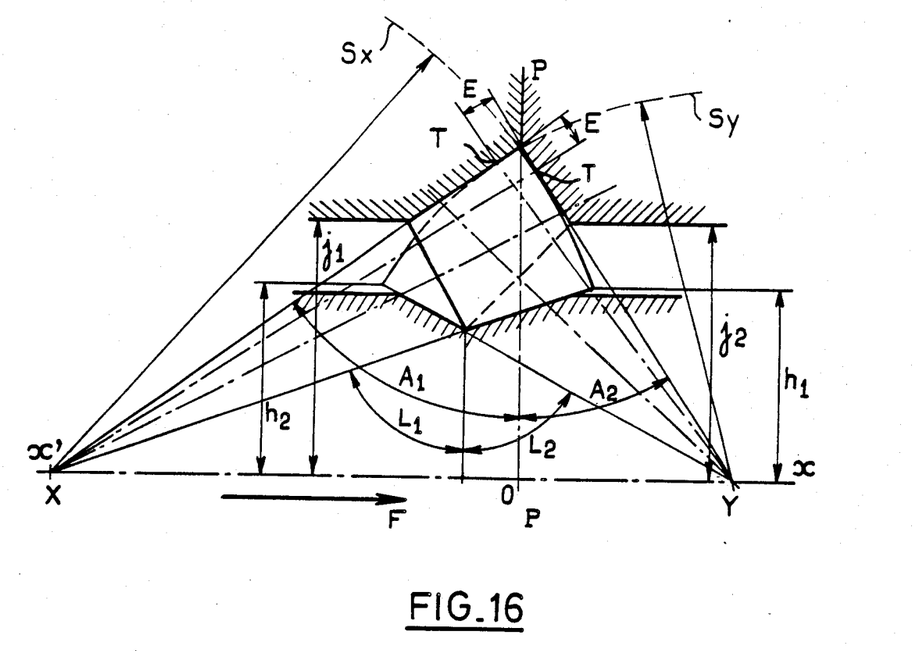
FIG. 16 is a view similar to FIG. 1 but concerning a variant.

As shown in FIG. 16, it is then possible, in accordance with the invention, to arrange that the raceway 7, which must support the greatest and the most frequent axial force, makes with the radial plane PP an angle $A_2$ which is smaller than the angle $A_1$ made with the same plane and the generatrix 6 of the contiguous raceway. In this case, the angle $A_1$ may be greater than 45°, but the sum $A_1+A_2$ is less than 90°. Of course, the plane PP is no longer the plane of symmetry for the rings.

The two types of rollers have different height/diameter ratios and tapers. The slopes of the inner and outer raceways also differ. On the other hand, the angle $E=90-A_1-A_2$ is obviously the same for both types of rollers.

The condition of satisfactory operation of this bearing is that the two series of alternating different rollers be capable of turning at the same speed around the axis x'x of the bearing without sliding of the rollers on the tapered raceways. This additional condition is satisfied in accordance with the invention when the distances between the axis x'x and each of the theoretical angles presented by the rollers when viewed in profile, close to the edges of the raceways, are equal for both series of rollers, on one hand as concerns the inner raceways and, on the other hand, as concerns the outer raceways. In other words, there must be obtained, referring to FIG. 16 the relationships $h_2=h_1$ and $j_2=j_1$, irrespective of the angles $A_1$, $A_2$, $L_1$, $L_2$ and E.

In other words, for each ring, the generatrices of the rollers by which the rollers of the two series are in rolling contact with the ring have in the direction of the other ring theoretical ends located at equal distances from the axis x'x.

The conditions ensuring that all the rollers are in orbit at the same speed around the axis x'x of the bearing avoid the following drawbacks:

(1) large amounts of sliding between rollers and the raceways, which cause wear and abnormally high heating and unacceptable mechanical losses;

(2) marked forces of contact between contiguous rollers or on the inserted separators or on the edges of the cage, which also results in wear and heating, with the attendant risk of putting these elements prematurely out of service.

The axial load capacity is at a maximum when the axial force applied to the inner raceways is in the direction of arrow F in the case of FIG. 16. i.e. so directed as to load the rollers having the largest diameter.

The ratio of the static axial capacities is substantially proportional to the ratio of the mean diameters of the rollers.

Figure 17:
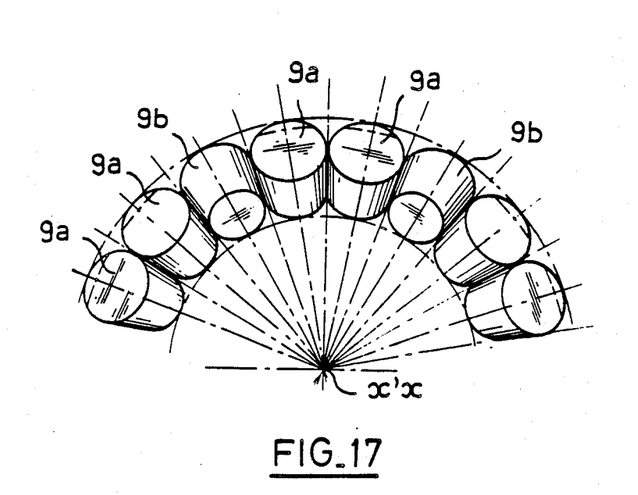
FIG. 17 is a view similar to FIG. 4, but concerning a variant.

In order that the bearing accept an axial load which is predominant in one direction, it is also possible, as shown in FIG. 17, to provide more rollers in the most stressed series. There may be, for example, provided as shown, the succession of two rollers such as 9a, a roller such as 9b, two rollers such as 9a, etc. In this example, the total number of rollers is a multiple of 3. The variant with rollers 9a and 9b in unequal numbers may be combined with that described with reference to FIG. 16, the more numerous rollers being those whose diameter is the larger.

I claim:

1. A crossed tapered roller bearing, comprising:
an inner ring;
an outer ring disposed around said inner ring, wherein each said ring is centered on a bearing axis and each said ring defines two frustoconical raceways which are in confronting relation to each other and which together have a concave profile; and
two series of rollers, each said roller having a generally frustoconical shape, said rollers of a first said series having a frustoconical lateral wall interposed between one of said raceways of said outer ring and an axially opposed raceway of said inner ring, and said rollers of the second said series, alternating with said rollers of said first series, having a frustoconical lateral wall interposed between the other two said raceways;
wherein each said roller further has a relatively large base portion comprising a crown portion is slidably bearing relation with a confronting said raceway of said outer ring, said frustoconical lateral walls of said rollers of each respective said series and the respective said raceways between which said series is interposed converge substantially toward respective apexes located substantially on said bearing axis, and said crown portions of said rollers of each said series are spherical portions having centers at said respective apexes; and
wherein the angle between said raceways of said outer ring is less than 90° such that said crown portion of each said roller contacts said respective confronting raceway of said outer ring substantially along a segment of a circle centered on said bearing axis, and said angle between said raceways of said outer ring is chosen in relation to the conicity of said frustoconical lateral walls of each said roller such that the distance between the apex of said angle between said raceways of said outer ring and the contact between said crown portion of each said roller and said respective confronting raceway is substantially between 10% and 20% of the diameter of said roller at said relatively large base portion.

2. The bearing as set forth in claim 1, wherein both said raceways on each said ring are at the same angle to a plane perpendicular to said bearing axis.

3. The bearing as set forth in claim 1, wherein:
said angle between said raceways of said outer ring is further chosen in relation to the conicity of said frustoconical lateral walls of each said roller such that said segment of a circle centered on said bearing axis whereat said crown portion of each said roller contacts said respective confronting raceway has a length substantially between 50% and 75% of said diameter of said roller at said relatively large base portion.

4. The bearing as set forth in claim 1, wherein the number of said rollers is between 14 and 28.

5. The bearing as set forth in claim 4, wherein the number of said rollers is between 20 and 22.

6. The bearing as set forth in claim 1, wherein the angle at which said frustoconical lateral walls of said rollers converge toward their respective apex is between approximately 8° and 15°.

7. The bearing as set forth in claim 1, wherein said angle between said raceways of said outer ring is substantially between 87° and 89°.

8. The bearing as set forth in claim 1, wherein said rollers are in substantially adjoining relation to one another and have locations of contact therebetween, said rollers of at least one of said series of rollers having annular recesses on said frustoconical lateral walls thereof passing through said locations of contact such that said locations of contact are segments of a line of contact between two adjacent said rollers.

9. The bearing as set forth in claim 1, and further comprising a cage maintaining said rollers equally spaced apart from one another.

10. The bearing as set forth in claim 1, and further comprising a separating member interposed between each pair of adjacent rollers.

11. The bearing as set forth in claim 10, wherein each said separating member comprises two opposed surfaces conforming to the shape of said frustoconical lateral walls of a respective said pair of adjacent rollers.

12. The bearing as set forth in claim 1, wherein:
said rollers substantially satisfy the relation $D/H > 1.1$, in which D is said diameter of said roller at said relatively large base porton, and H is the axial length of said rollers.

13. The bearing as set forth in claim 1, wherein said frustoconical lateral wall of each said roller is axially longer than the width of its respective said raceway of said inner ring, whereby said rollers overhang respective outer edges of said inner raceways.

14. The bearing as set forth in claim 1, wherein each said raceway of said outer ring is at a different angle to a plane perpendicular to said bearing axis.

15. The bearing as set forth in claim 14, wherein the generatrices of said rollers of both of said series of rollers at the respective said raceways of said outer ring have inner theoretical ends equidistant from said bearing axis, and the generatrices of said rollers of both of said series of rollers at respective said raceways of said inner ring have outer theoretical ends equidistant from said bearing axis.

16. The bearing as set forth in claim 1, wherein said series of rollers are alternated such that there are more of one said series than the other said series.

17. A crossed tapered roller bearing in combination with an integral hub of an automobile drive wheel, a hub carrier, and a transmission joint which comprises a driving element and a driven element, wherein said roller bearing comprises:
an inner ring;
an outer ring disposed around said inner ring, wherein each said ring is centered on a bearing axis and each said ring defines two frustoconical raceways which are in confronting relation to each other and which together have a concave profile; and
two series of rollers, each said roller having a generally frustoconical shape, said rollers of a first said series having a frustoconical lateral wall interposed between one of said raceways of said outer ring and an axially opposed raceway of said inner ring, and said rollers of the second said series, alternating with said rollers of said first series, having a frustoconical lateral wall interposed between the other two said raceways;
wherein each said roller further has a relatively large base portion comprising a crown portion in slidably bearing relation with a confronting said raceway of said outer ring, said frustoconical lateral walls of said rollers of each respective said series and the respective said raceways between which said series is interposed converge substantially toward respective apexes located substantially on said bearing axis, and said crown portions of said rollers of each said series are spherical portions having centers at said respective apexes;
wherein the angle between said raceways of said outer ring is less than 90° such that said crown portion of each said roller contacts said respective confronting raceway of said outer ring substantially along a segment of a circle centered on said bearing axis, and said angle between said raceways of said outer ring is chosen in relation to the conicity of said frustoconical lateral walls of each said roller such that the distance between the apex of said angle between said raceways of said outer ring and the contact between said crown portion of each said roller and said respective confronting raceway is substantially between 10% and 20% of the diameter of said roller at said relatively large base portion;
wherein said driven element of said transmission joint comprises said inner ring; and
wherein said outer ring comprises two partial rings, one said partial ring is integral with and a part of said hub carrier, the other said partial ring comprises an annular flange disposed adjacent to said hub carrier, and a fixing means fixes said flange to said knob carrier.

* * * * *